Patented Mar. 6, 1923.

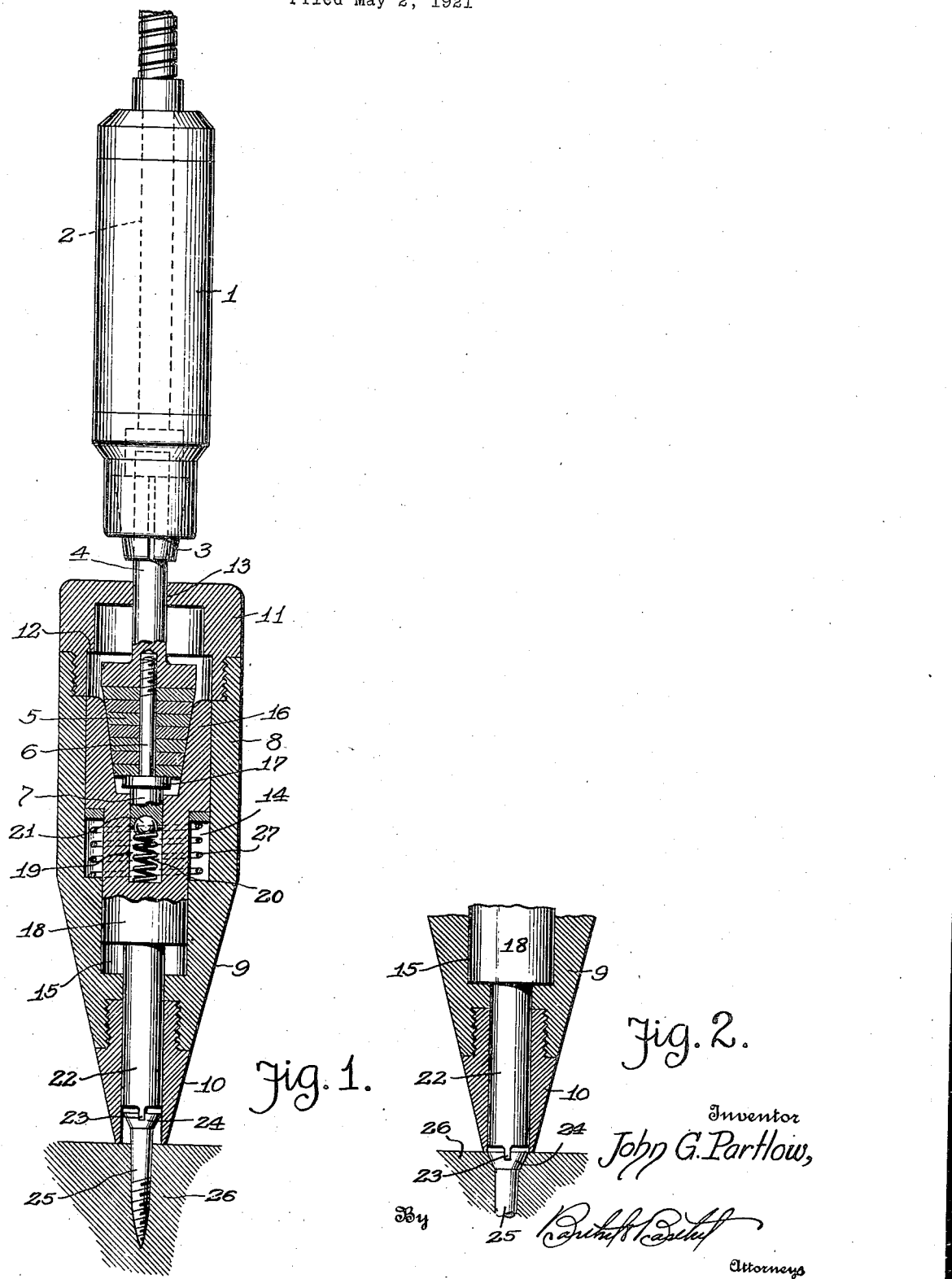

1,447,626

UNITED STATES PATENT OFFICE.

JOHN G. PARTLOW, OF DETROIT, MICHIGAN.

SCREW-OPERATING DEVICE.

Application filed May 2, 1921. Serial No. 466,046.

*To all whom it may concern:*

Be it known that I, JOHN G. PARTLOW, a citizen of the United States of America, residing at Detroit, in the county of Wayne and State of Michigan, have invented certain new and useful Improvements in Screw-Operating Devices, of which the following is a specification, reference being had herein to the accompanying drawings.

This invention relates to a screw operating device by which various types of screws may be rotated and driven into material, and one object of my invention is to provide such a device that may be motor operated and manually controlled, the device including means for establishing a driving relation between the motor and the screw until the screw is driven home, when said means is actuated to disconnect the motor driven means relative to the screw, thus preventing the screw or the device from being injured by an excessive action.

Another object of my invention is to provide a motor driven device that may be placed over the head of a screw to rotate it until the screw is fully seated or countersunk in a piece of material, the device including a novel clutch normally establishes a driving relation between parts of the device, but which disconnects parts of the device after a predetermined operation.

A further object of my invention is to provide tools that may be advantageously used in the automobile industry, where brackets, irons and other hardware are attached to automobile bodies by screws, it being a well known fact that considerable time and labor is required to place such screws in the bodies, especially when hard wood and other indurate material are encountered.

The above and other objects are attained by a construction that will be hereinafter described and then claimed, and reference will now be had to the drawing, wherein—

Figure 1 is a longitudinal sectional view of the screw operating device, showing the device in driving relation to a screw, and Fig. 2 is a similar view of a portion of the device showing the screw fully seated.

In the drawing, the reference numeral 1 denotes a handle through which extends a flexible shaft 2 adapted to be driven by a motor or from a suitable source of power (not shown). The shaft 2 is suitably connected to a chuck 3 in the outer end of the handle 1 and said chuck is adapted to hold the spindle 4 of a conical clutch member 5, said member consisting of a plurality of closely assembled friction disks held in abutting relation by an axial screw 6 which has a flanged socket head 7 protruding from the clutch member.

The reference numeral 8 denotes a cylindrical tool body having an outer conical end portion 9 provided with detachable nose piece 10, and the inner end of the tool body 8 has a cap 11 affording an annular shoulder or abutment 12. The cap 11 has a central opening 13 providing clearance for the clutch spindle 4 and said cap is placed on the spindle prior to connecting said spindle to the chuck 3.

The tool body 8 conforms somewhat to a cylinder and has communicating recesses 14 and 15. In the recess 14 is a slidable clutch member 16 which has a conical recess 17 to receive the clutch 5, and extending into the recess 15 is a cylindrical neck portion 18 of the clutch member 16. This neck portion is provided with an axial recess or bore 19 into which extends the socket head 7. In the recess or bore 19 is a coiled expansion spring 20 maintaining a ball or bearing member 21, constantly in engagement with the socket 7 of the screw 6. The expansive force of the spring 20 is adapted to impart impetus to the clutch member 5 so that the clutch members 5 and 16 may separate and temporarily destroy the driving relation between said clutch members.

The neck portion 18 of the clutch member 16 is provided with a stem 22 extending through the conical end portion 9 and the nose 10 of the tool body, and said stem has a tang 23 adapted to engage in the slotted head 24 of a screw 25, so that said screw may be rotated and driven into a piece of material 26 when the clutch members 5 and 16 are in driving relation and driven from the flexible shaft 2.

In the recess 14 and surrounding the neck portion 18 of the clutch member 16 is a coiled expansion spring 27 and the expansive force of this spring is adapted to maintain the clutch member 16 in engagement with the clutch member 5, especially during the driving of the screw 25.

Considering the operation of the tool, the screw 25 is first driven or started in the piece of material 26 by a hammer or suitable tool, and then the nose 10 of the tool body 8 is placed down over the screw 25 with the tang 23 in engagement with the slotted head 24 of the screw. When the flexible shaft 2 is placed in operation the rotary movement of said shaft is transmitted through the clutch members 5 and 16 to the stem 22, so that said stem will rotate the screw 25 and drive the screw home, with the head 24 thereof countersunk in the piece of material 26 as shown in Fig. 2. During this operation, sufficient pressure is brought to bear on the clutch member 5 by the operator holding the hand piece or handle 1 to establish a driving relation between the clutch member 5 and the clutch member 16, and consequently the springs 20 and 27 are placed under tension, especially the latter. When the screw 25 has been driven home, the operator reduces the pressure maintained by the handle 1 and the spring 27 is permitted to shift the clutch member 16 until it abuts the annular shoulder or abutment 12 of the shaft 11. Such shifting of the clutch member 16 is sufficient to jar the clutch member 5, and if it has not become disengaged relative to the clutch member 16, then the expansive force of the spring 20 is sufficient to dislodge or disconnect the clutch member 5 relative to the clutch member 16, thus disconnecting the driving relation between the clutch members within the tool body.

It is thought that the operation and utility of my improved tool will be apparent without further description, and while in the drawing there is illustrated a preferred embodiment of my invention, it is to be understood that the structural elements are susceptible to such variations and modifications as fall within the scope of the appended claim.

What I claim is:—

A screw operating device comprising a driven chuck, a conical clutch member mounted therein, a tool body in which said conical clutch member is inclosed, a clutch member slidable in said tool body and provided with a recess to receive said conical clutch member so that a driving relation may be established between said clutch members, said recessed clutch member having a neck portion provided with a screw engaging stem, said tool body normally extending beyond said slidable clutch member to constitute a guide for a screw adapted to be engaged by the screw engaging stem of said recessed clutch member, a spring encircling the neck portion of said recessed clutch member and adapted to shift said clutch members towards one end of said tool body so as to retain said tool body normally beyond said slidable clutch member, and a spring in the neck portion of the recessed clutch member adapted to separate said clutch members.

In testimony whereof I affix my signature in presence of two witnesses.

JOHN G. PARTLOW.

Witnesses:
KARL H. BUTLER,
ANNA M. DORR.